US012323406B2

(12) United States Patent
Wright et al.

(10) Patent No.: US 12,323,406 B2
(45) Date of Patent: Jun. 3, 2025

(54) SIGN-UP AUTHENTICATION (71) Applicant: Capital One Services, LLC, McLean, VA (US)

(72) Inventors: Aaron Wright, Midlothian, VA (US); Kelly Morse Kornman, Mechanicsville, VA (US); Omer Alrefaai, Dublin, OH (US)

(73) Assignee: Capital One Services, LLC, McLean, VA (US)

( * ) Notice: Subject to any disclaimer, the term of this patent is extended or adjusted under 35 U.S.C. 154(b) by 246 days.

(21) Appl. No.: 17/812,601

(22) Filed: Jul. 14, 2022

(65) Prior Publication Data
US 2024/0022552 A1 Jan. 18, 2024

(51) Int. Cl.
H04L 29/00 (2006.01)
H04L 9/40 (2022.01)
H04L 51/42 (2022.01)

(52) U.S. Cl.
CPC .............. H04L 63/08 (2013.01); H04L 51/42 (2022.05)

(58) Field of Classification Search
CPC ....... H04L 63/08; H04L 51/42; H04L 51/224; H04L 63/083
See application file for complete search history.

(56) References Cited

U.S. PATENT DOCUMENTS

| 6,684,248 | B1* | 1/2004 | Janacek | H04L 51/48 709/225 |
| 8,312,119 | B2* | 11/2012 | Gillum | H04L 63/083 709/223 |
| 9,055,055 | B1* | 6/2015 | Strand | G06F 21/45 |
| 9,762,576 | B2* | 9/2017 | Dispensa | H04L 63/0869 |
| 9,819,673 | B1* | 11/2017 | Johansson | H04W 12/068 |
| 10,944,729 | B2* | 3/2021 | Scheinuk | G06Q 10/107 |
| 11,048,794 | B1* | 6/2021 | Bordow | H04L 63/102 |
| 11,671,422 | B1* | 6/2023 | Salehpour | H04L 63/18 726/7 |
| 11,983,696 | B2* | 5/2024 | Killoran, Jr. | G06Q 20/425 |
| 2003/0028767 | A1* | 2/2003 | Bickford | H04L 63/08 713/169 |
| 2009/0228564 | A1* | 9/2009 | Hamburg | H04L 51/18 709/206 |

(Continued)

FOREIGN PATENT DOCUMENTS

CN 104994008 A * 10/2015 ......... G06F 16/9535

Primary Examiner — Don G Zhao
(74) Attorney, Agent, or Firm — Harrity & Harrity, LLP (57) ABSTRACT In some implementations, a system may receive user e-mail data indicating an e-mail address and an e-mail password associated with an e-mail account of a user. The system may access the e-mail account via the e-mail address and the e-mail password. The system may identify, in the e-mail account, a sign-up authentication e-mail message associated with a sign-up by the user with an interaction party based on one or more sign-up indicators associated with the sign-up authentication e-mail message. The system may transmit a notification, to a user device, requesting confirmation that the user signed up for an account with the interaction party. The system may receive, from the user device, a user input confirming that the user signed up for the account. The system may activate a link in the sign-up authentication e-mail message to authenticate the sign-up.

20 Claims, 7 Drawing Sheets

(56) References Cited

U.S. PATENT DOCUMENTS

| | | | | |
|---|---|---|---|---|
| 2010/0125637 | A1* | 5/2010 | Gonda | H04L 51/063 709/206 |
| 2010/0217694 | A1* | 8/2010 | Knighton | G06Q 40/123 705/31 |
| 2010/0306040 | A1* | 12/2010 | Arumugam | G06Q 30/02 705/14.16 |
| 2011/0225485 | A1* | 9/2011 | Schnitt | G06F 40/174 715/224 |
| 2011/0252146 | A1* | 10/2011 | Santamaria | H04L 65/1089 709/227 |
| 2012/0185542 | A1* | 7/2012 | Vyrros | H04L 51/48 709/206 |
| 2013/0326221 | A1* | 12/2013 | Murphy | H04L 51/18 713/168 |
| 2014/0047560 | A1* | 2/2014 | Meyer | G06F 21/62 726/28 |
| 2014/0101733 | A1* | 4/2014 | Cain | G06F 21/31 726/5 |
| 2014/0189820 | A1* | 7/2014 | Pieczul | G06F 21/31 726/5 |
| 2014/0245015 | A1* | 8/2014 | Velamoor | H04L 63/108 713/171 |
| 2014/0304836 | A1* | 10/2014 | Velamoor | G06F 21/6209 726/28 |
| 2014/0317644 | A1* | 10/2014 | Bermudez | H04N 21/812 725/9 |
| 2015/0032824 | A1* | 1/2015 | Kumar | H04L 67/535 709/206 |
| 2015/0067804 | A1* | 3/2015 | Maxwell | H04L 51/48 726/7 |
| 2015/0135300 | A1* | 5/2015 | Ford | G06Q 50/18 726/11 |
| 2015/0163206 | A1* | 6/2015 | McCarthy | G06F 21/6227 726/4 |
| 2015/0310188 | A1* | 10/2015 | Ford | H04L 63/101 726/28 |
| 2015/0326517 | A1* | 11/2015 | Block | H04L 67/12 709/206 |
| 2016/0180334 | A1* | 6/2016 | Kassemi | G06Q 20/385 705/65 |
| 2017/0041296 | A1* | 2/2017 | Ford | G06F 21/64 |
| 2017/0046944 | A1* | 2/2017 | Namazi | G08B 27/00 |
| 2017/0142057 | A1* | 5/2017 | Killoran, Jr. | H04L 67/14 |
| 2017/0147600 | A1* | 5/2017 | Brand | G06Q 10/107 |
| 2017/0148011 | A1* | 5/2017 | Killoran, Jr. | G06Q 20/3255 |
| 2017/0345003 | A1* | 11/2017 | Spears | H04L 63/102 |
| 2018/0060581 | A1* | 3/2018 | El-Moussa | G06F 21/554 |
| 2018/0060582 | A1* | 3/2018 | El-Moussa | G06N 3/044 |
| 2018/0068274 | A1* | 3/2018 | Buffington | G06Q 40/06 |
| 2019/0349351 | A1* | 11/2019 | Verma | H04L 63/30 |
| 2021/0021637 | A1* | 1/2021 | Srivastava | H04L 63/0876 |
| 2022/0086133 | A1* | 3/2022 | Killoran, Jr. | H04L 51/18 |
| 2022/0103539 | A1* | 3/2022 | Rose | H04M 7/0078 |
| 2022/0180368 | A1* | 6/2022 | Immaneni | G06Q 20/4014 |
| 2022/0210141 | A1* | 6/2022 | Parekh | H04L 63/08 |
| 2023/0005016 | A1* | 1/2023 | MacDonald-Korth | H04L 63/101 |
| 2023/0214805 | A1* | 7/2023 | Kumar | G06Q 20/227 705/406 |
| 2024/0022552 | A1* | 1/2024 | Wright | H04L 63/08 |

\* cited by examiner

SIGN-UP AUTHENTICATION

BACKGROUND

Electronic mail (e-mail) is a method of exchanging messages between people using electronic devices. E-mail systems are based on a store-and-forward model. E-mail servers accept, forward, deliver, and store messages. Businesses use e-mail for a variety of purposes, including e-mail marketing via opt-in. In some forms of opt-in e-mail marketing, the businesses send new subscribers a confirmation e-mail for the new subscribers to verify that it was them that subscribed to the businesses' service or mailing list.

SUMMARY

Some implementations described herein relate to a system for authenticating a sign-up by a user with an interaction party. The system may include one or more memories and one or more processors communicatively coupled to the one or more memories. The one or more processors may be configured to receive, from a user device of the user, user e-mail data indicating an e-mail address and an e-mail password associated with an e-mail account of the user. The one or more processors may be configured to store the user e-mail data in a data structure under a user account of the user. The one or more processors may be configured to access the e-mail account of the user via the e-mail address and the e-mail password. The one or more processors may be configured to identify, in the e-mail account, a sign-up authentication e-mail message associated with a sign-up by the user with the interaction party based on one or more sign-up indicators associated with the sign-up authentication e-mail message, which may include a link to authenticate the sign-up with the interaction party by the user. The one or more processors may be configured to transmit a notification to the user device of the user. The notification may request confirmation from the user that the user signed up for an account with the interaction party. The one or more processors may be configured to receive, from the user device, a user input confirming that the user signed up for the account with the interaction party. The one or more processors may be configured to activate the link in the sign-up authentication e-mail message to authenticate the sign-up with the interaction party by the user.

Some implementations described herein relate to a method of authenticating a sign-up by a user with an interaction party. The method may include establishing, by a system having one or more processors, a connection with an e-mail server that hosts an e-mail account of the user. The method may include obtaining, by the system and from a user account associated with the user, an e-mail address and an e-mail password associated with the e-mail account. The method may include accessing, by the system, the e-mail account via the e-mail address and the e-mail password. The method may include identifying, by the system and in the e-mail account, a sign-up authentication e-mail message associated with a sign-up by the user with the interaction party based on one or more sign-up indicators associated with the sign-up authentication e-mail message. The method may include authenticating, by the system and to an interaction party server of the interaction party, the sign-up by the user with the interaction party in response to the sign-up authentication e-mail message.

Some implementations described herein relate to a non-transitory computer-readable medium that stores a set of instructions for a device. The set of instructions, when executed by one or more processors of the device, may cause the device to receive, from a user device of a user, user e-mail data indicating an e-mail address and an e-mail password associated with an e-mail account of the user. The set of instructions, when executed by one or more processors of the device, may cause the device to access the e-mail account of the user via the e-mail address and the e-mail password. The set of instructions, when executed by one or more processors of the device, may cause the device to identify, in the e-mail account, a sign-up authentication e-mail message associated with a sign-up by the user with an interaction party based on one or more sign-up indicators associated with the sign-up authentication e-mail message. The set of instructions, when executed by one or more processors of the device, may cause the device to authenticate, to an interaction party server of the interaction party, the sign-up by the user with the interaction party in response to the sign-up authentication e-mail message.

DETAILED DESCRIPTION

The following detailed description of example implementations refers to the accompanying drawings. The same reference numbers in different drawings may identify the same or similar elements.

A user may sign up with a particular interaction party (e.g., a business or an organization). For example, the user may sign up for an account, a newsletter, and/or updates associated with the interaction party. As part of the sign-up process, the user may be required to provide an e-mail address via which the user may access the user's account with the interaction party and/or receive content from the interaction party. In some instances, the interaction party may send, to the e-mail address provided by the user, a confirmation e-mail requiring additional action by the user to confirm that the user indeed signed up with the interaction party. For example, the confirmation e-mail may include a link that the user may be required to select, which sends data to the interaction party indicating confirmation by the user.

However, in some instances, the user may not have access to the user's e-mail account when the confirmation e-mail is sent. Additionally, the confirmation e-mail may be automatically put into a spam folder by the user's e-mail server, depending on the filter settings of the e-mail server. Alternatively, the user may simply overlook or miss the confirmation e-mail in the user's inbox. As a result, it is possible that the user is unable to confirm the sign-up until a later time or at all. Because the sign-up was not confirmed, the interaction party may be left in a limbo state with respect to the user's sign-up. To address this limbo state, the interaction party may send one or more additional confirmation e-mails. Additionally, or alternatively, the interaction party may cancel the user's sign-up, which may result in the user signing up again. In either scenario, computing resources of the interaction party's system, the user's device(s), and/or the user's e-mail server may be unnecessarily expended. Accordingly, it is desirable to have a system that may timely confirm the user's sign-up in response to a confirmation e-mail sent by the interaction party to conserve computing resources of the interaction party's system, the user's device(s), and/or the user's e-mail server.

Some implementations described herein relate to a system that may authenticate a user's sign-up with an interaction party on the user's behalf. The system may receive user e-mail data indicating an e-mail address and an e-mail password associated with an e-mail account of a user and by which the system may access the e-mail account. The system may scan the e-mail messages in the e-mail account for one or more sign-up indicators associated with the sign-up authentication e-mail message. After identifying a particular e-mail message as a sign-up authentication e-mail message sent by the interaction party, the system may confirm the sign-up by the user by transmitting a sign-up authentication to the interaction party to complete the sign-up process.

By relying on a system separate from the user, the sign-up confirmation process to complete the sign-up process may be efficiently and timely performed. As a result, computing resources of the user (e.g., a user device) and/or of the interaction party (e.g., an interaction party server) may be conserved by not having to perform the tasks that are performed by the system (e.g., scanning e-mail messages and sending sign-up authentications) and/or to remedy those tasks not being performed (e.g., by sending additional e-mail messages and/or starting all over the sign-up process).

FIGS. 1A-1D are diagrams of an example 100 associated with sign-up authentication. As shown in FIGS. 1A-1D, example 100 includes a user device, a sign-up authentication system, an account profile database, a user e-mail server, a user e-mail database, and an interaction party server. These devices are described in more detail in connection with FIGS. 2 and 3.

Figure 1A:
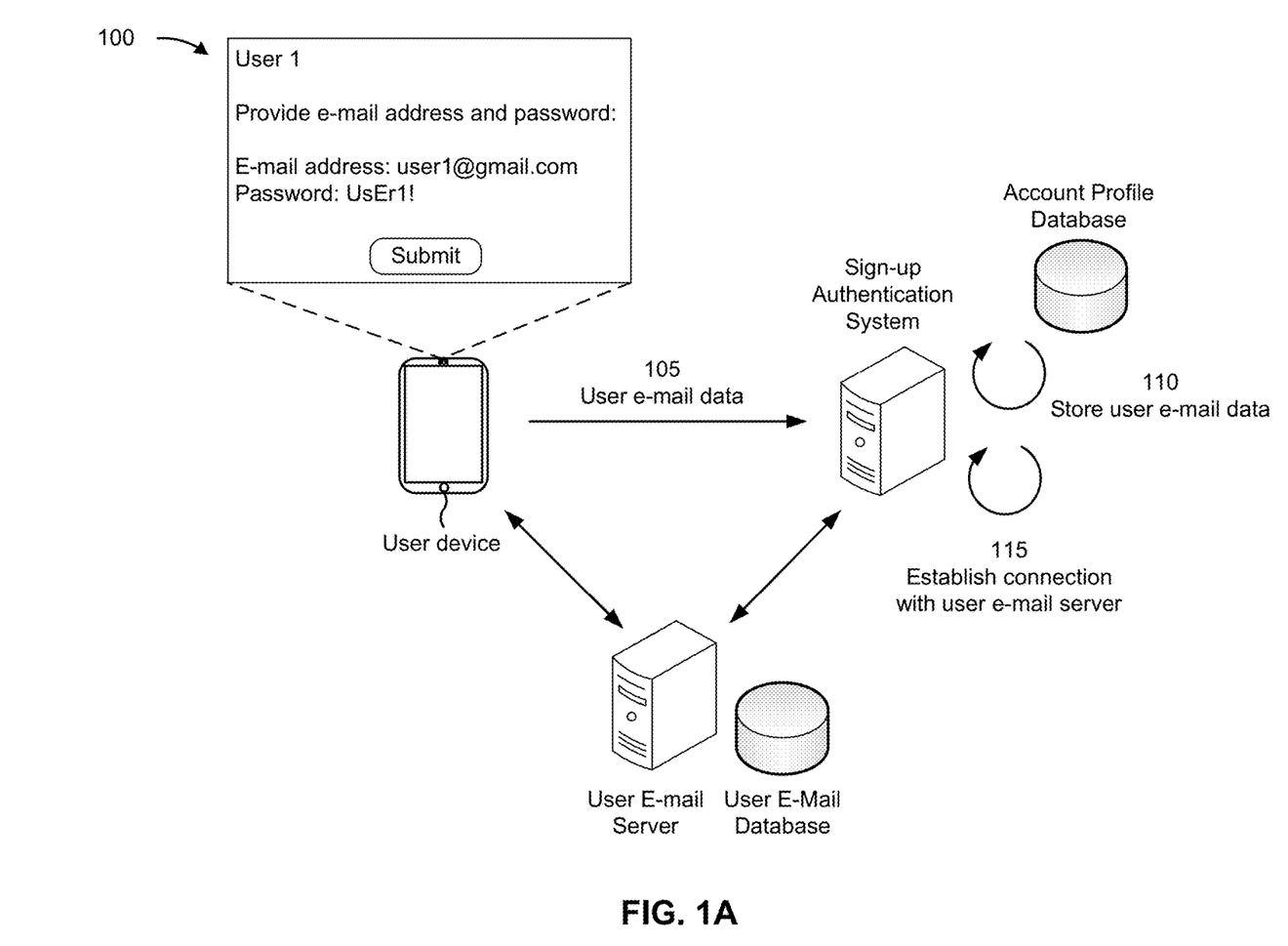
FIGS. 1A-1D are diagrams of an example implementation relating to sign-up authentication, in accordance with some embodiments of the present disclosure.

As shown in FIG. 1A, a user may have an account (e.g., a user account) with a sign-up authentication system that may be configured to authenticate sign-ups (e.g., subscriptions) by the user with an interaction party (e.g., a news provider, a service provider, or a merchant) based on an e-mail address of the user. The sign-up authentication system may have access, as granted by the user, to an e-mail account of the user (e.g., a user e-mail account). As a result, the sign-up authentication system may be able to monitor the user e-mail account (e.g., an inbox and/or a spam folder) for e-mail messages from an interaction party with which the user signed up (e.g., for an account, a mailing list, and/or a newsletter) to authenticate the sign-up, as described in more detail below.

As shown by reference number 105, the sign-up authentication system may receive, from a user device of the user, user e-mail data indicating the user e-mail address. The user-email data also may indicate a corresponding e-mail password associated with the user e-mail account so that the sign-up authentication system may log in to the user e-mail account, as described below. Additionally, or alternatively, the e-mail data may indicate a digital authenticator (e.g., an authentication token), which may be provided, to the user, by an e-mail server associated with the user e-mail account. Alternatively, the e-mail server may provide the digital authenticator directly to the sign-up authentication system. The digital authenticator may be used in lieu of the e-mail password, as a security and/or privacy measure for the sign-up authentication system to gain access to the user e-mail account without the user having to provide the e-mail password. Alternatively, the digital authenticator may be provided in addition to the e-mail password, for example, as a secondary security measure to gain access to the user e-mail account.

As shown by reference number 110, the sign-up authentication system may store the user e-mail data in a data structure (e.g., in the account profile database under the user account). The user may have more than one e-mail address and corresponding e-mail password, of respective user e-mail accounts, stored under the user account. Additionally, for each user e-mail account, the user account may have access settings that define the level of access that the sign-up authentication system may have to the particular e-mail account. For example, the sign-up authentication system may have access to the inbox of the particular e-mail account and/or to the spam folder. As another example, the sign-up authentication system may be able to interact with content in a particular received e-mail message in the user e-mail account and/or may be able to send an e-mail message (e.g., as a reply to the received e-mail message) on behalf of the user. The access settings may be the same for all user e-mail accounts stored under the user account or may be specific for each user e-mail account.

As shown by reference number 115, the sign-up authentication system may establish a connection with a user e-mail server associated with a particular user e-mail account based on the corresponding user e-mail address and e-mail password. Accordingly, the sign-up authentication system may have access to the user e-mail server and user e-mail database so that the sign-up authentication system may monitor the particular user e-mail account for e-mail messages from an interaction party with which the user signed up.

Figure 1B:
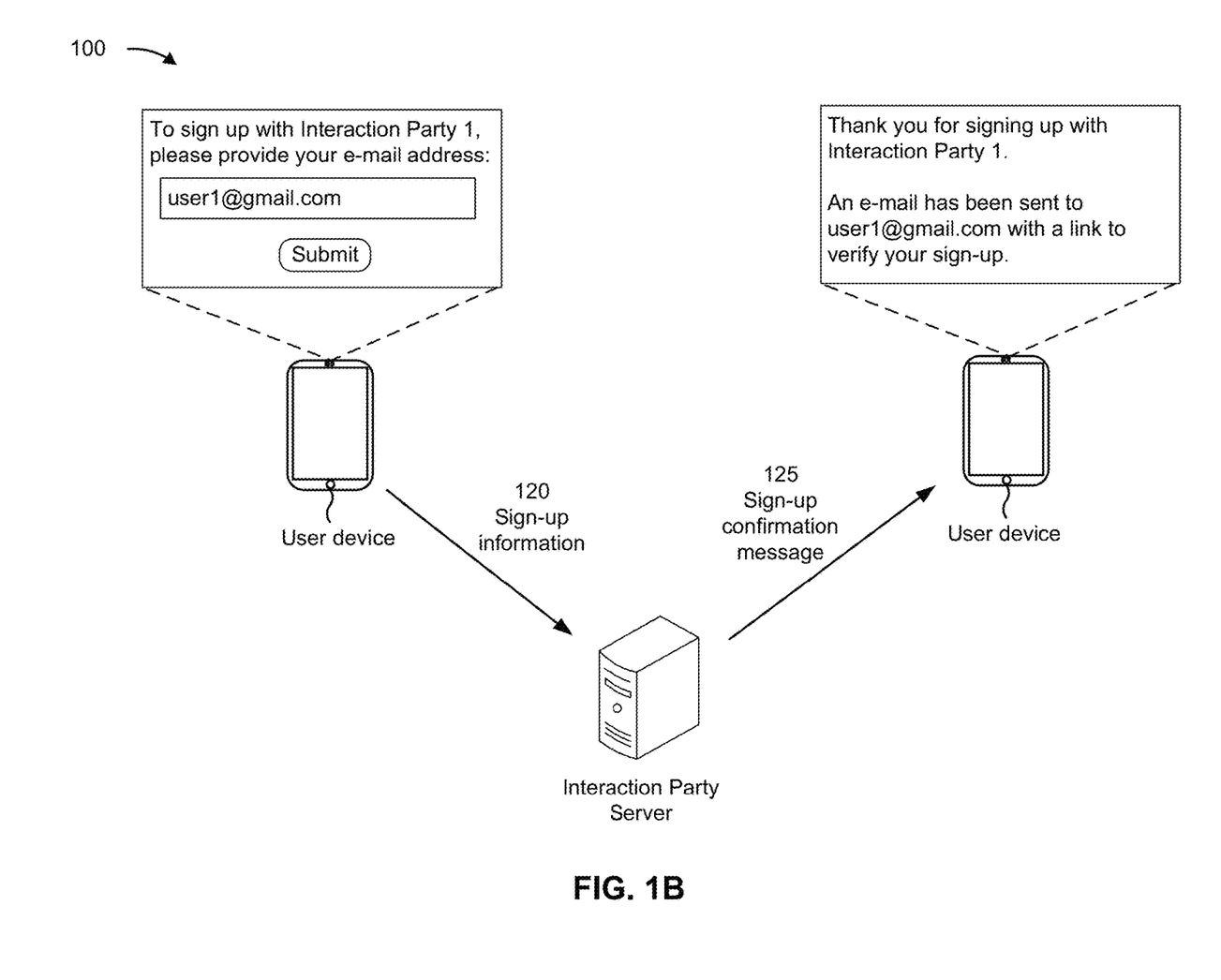

As shown in FIG. 1B, a user may sign up with an interaction party. For example, the user may sign-up for an account, a newsletter, and/or a mailing list associated with the interaction party. The user may perform the sign-up on the user device (e.g., via an application associated with the interaction party and installed on the user device or via a web-based application of the interaction party accessed by the user device over a network). As part of the sign-up process, the user device may present sign-up requirements (e.g., on a display of the user device). For example, the user device may present one or more entry fields in which sign-up information, such as the user's e-mail address, may be entered. Other sign-up information may include the user's name, the user's address, the user's birthdate or birthday, the user's financial or payment information, a username, and/or a password.

As shown by reference number 120, the user device may transmit, and the interaction party server may receive, the sign-up information. In some implementations, as shown by reference number 125, the interaction party server may transmit, and the user device may receive, a sign-up confirmation message. For example, the sign-up confirmation message may indicate that the sign-up information has been received. Additionally, or alternatively, the sign-up confirmation message may indicate that a sign-up authentication e-mail message has or will be sent to the e-mail address provided during the sign-up process, and that a further confirmation step by the user, as provided in the sign-up email message, is required.

Figure 1C:
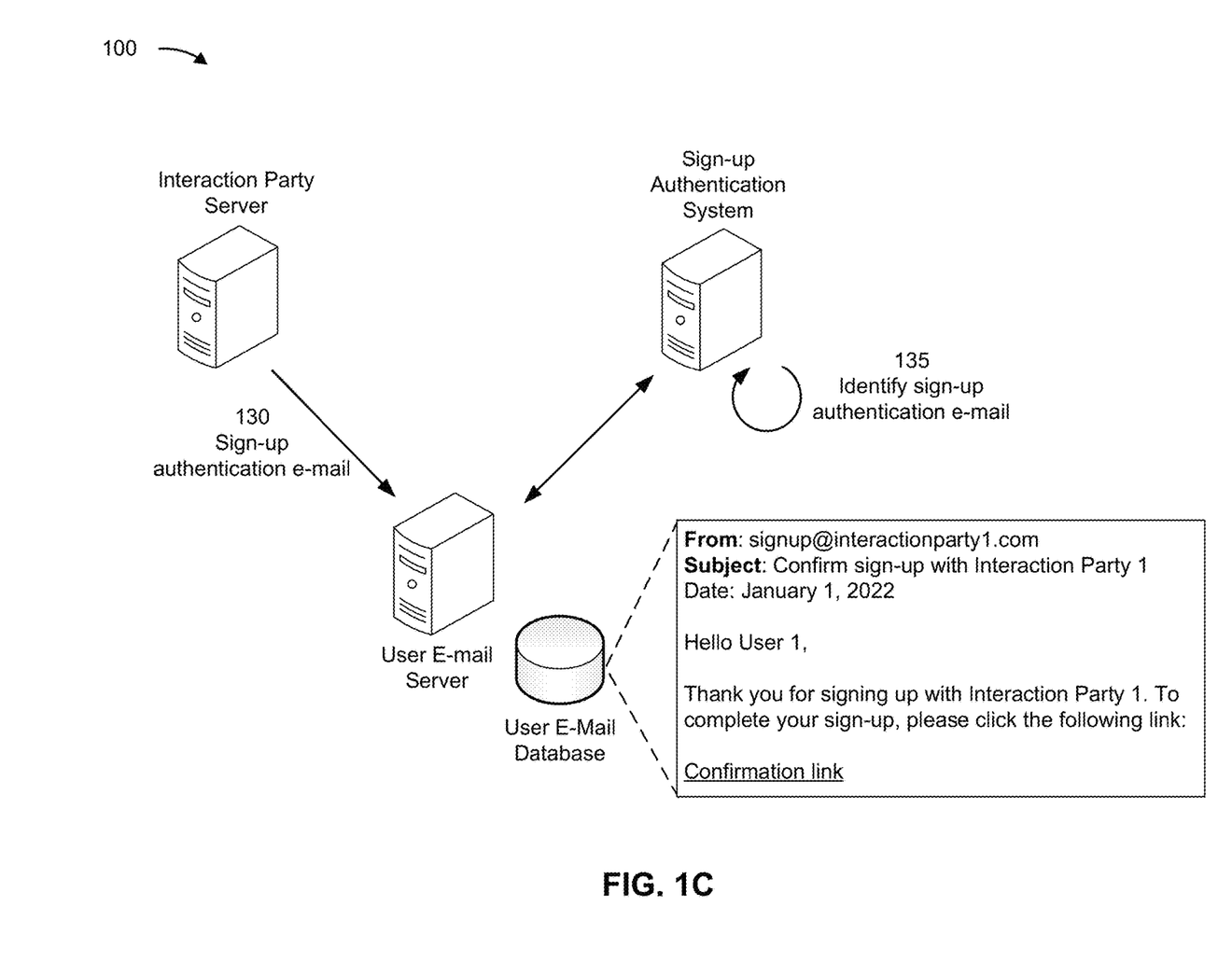

As shown in FIG. 1C, and by reference number 130, the interaction party server may transmit the sign-up authentication e-mail message to the user e-mail server associated with the user e-mail address provided by the user during sign-up. The user e-mail server may store the sign-up authentication e-mail message in the user e-mail database (e.g., in the inbox associated with the user e-mail account). In some implementations, as shown in FIG. 1C, the sign-up authentication e-mail message may include a link via which the user may authenticate the sign-up with the interaction party by the user (e.g., by pressing the link, clicking the link, or otherwise interacting with the link).

As shown by reference number 135, the sign-up authentication system may identify the sign-up authentication e-mail message from the user e-mail server based on one or more sign-up indicators, which may include one or more keywords or key phrases that the sign-up authentication system may associate with a sign-up authentication e-mail message (e.g., using a template matching technique and/or a semantic engine parser). For example, the sign-up authentication system may scan a subject line of a particular e-mail message, in the user e-mail account, in which the sign-up indicator(s) may be located. In some implementations, the subject line may include a preset subject line. For example, the sign-up authentication system may provide the preset subject line to one or more interaction parties, including the interaction party with which the user signed up, to use in any of the interaction parties' sign-up authentication e-mail messages. As a result, the sign-up authentication system may more efficiently, and with a high level of certainty, identify the sign-up authentication e-mail message from just the subject line, without having to expend computing resources searching bodies of e-mail messages in the user e-mail account for the sign-up indicator(s).

Additionally, or alternatively, the sign-up authentication system may scan the body of a particular e-mail message, in the user e-mail account, in which the sign-up indicator(s) may be located. In some implementations, the body may include a preset message. For example, the sign-up authentication system may provide the preset message to one or more interaction parties, including the interaction party with which the user signed up, to use in any of the interaction parties' sign-up authentication e-mail messages. As a result, the sign-up authentication system may more efficiently, and with a high level of certainty, identify the sign-up authentication e-mail message without having to analyze each word and/or phrase in the bodies of the e-mail messages.

In some implementations, the sign-up indicator(s) may include the user's name (e.g., in the body of the e-mail message). The sign-up authentication system may recognize the name based on the user's name (e.g., first name, last name, and/or nicknames) associated with the user account and stored in the account profile database. Additionally, or alternatively, the sign-up indicator(s) may include a sign-up code (e.g., a combination of alphanumeric characters and/or symbols) and/or sign-up image. The sign-up code and/or sign-up image may be unique to the particular user, and may be transmitted to the interaction party server (e.g., by the user device with the sign-up information) such that the sign-up authentication e-mail message sent by the interaction party server may include the unique sign-up code and/or sign-up image. Alternatively, the sign-up authentication system may transmit identifier data, to the interaction party server, indicating the sign-up code and/or sign-up image to use in any of the interaction party's e-mail messages.

In some implementations, the sign-up authentication system may monitor the user e-mail account on a continuous basis (e.g., at all times). For example, the sign-up authentication system may scan the user e-mail account continuously until a new e-mail message is received by the e-mail account. The sign-up authentication system then may scan the new e-mail message for the sign-up indicator(s). Alternatively, the sign-up authentication system may monitor the user e-mail account at set time intervals (e.g., every 5 minutes, every 30 minutes, every hour), and/or during set times of the day (e.g., between 8 AM and 8 PM). During the set time intervals and/or set time of day, the sign-up authentication system may scan any new e-mail messages (e.g., from the last time the sign-up authentication system scanned the user e-mail account) for the sign-up indicator(s).

Figure 1D:
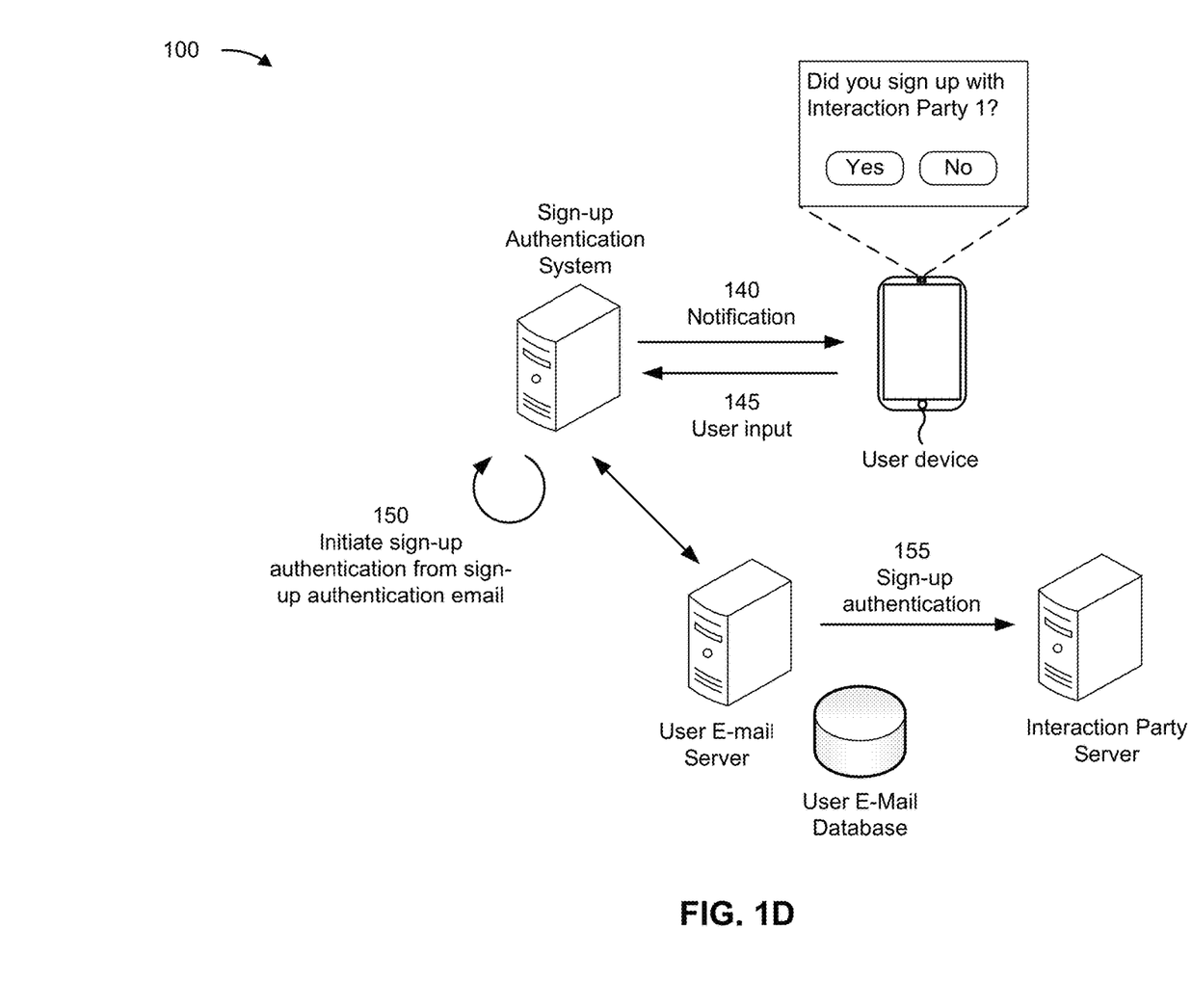

In some implementations, as shown in FIG. 1D, the sign-up authentication system may request confirmation from the user after the sign-up authentication system has identified a sign-up authentication e-mail message. For example, as shown by reference number 140, the sign-up authentication system may transmit a notification to the user device. The notification may request confirmation from the user that the user signed up for an account with the interaction party. As shown by reference number 145, the sign-up authentication system may receive, from the user device, user input indicating whether or not the user did sign up for the account with the interaction party. As shown by reference number 150, if the user input indicates that the user signed up for the account with the interaction party, then the sign-up authentication system may initiate sign-up authentication of the sign-up by the user.

The sign-up authentication system may determine whether or not to obtain additional confirmation from the user based on one or more factors. One example factor may be a setting in the user account with respect to the particular user e-mail account. For example, the user may have a setting for the particular user e-mail account to obtain additional confirmation via the notification. Another example factor may be based on the sign-up indicator(s) identified by the sign-up authentication system. For example, a particular sign-up code, message, and/or subject line may be associated with obtaining additional confirmation. The sign-up authentication system may provide the specific sign-up code, message, and/or subject line to particular interaction parties that require additional confirmation (e.g., as requested by the user and/or by the particular interaction parties).

As shown by reference number 155, the sign-up authentication system may transmit, without any user interaction, data indicating the sign-up authentication via the user e-mail server. For example, in implementations in which the sign-up authentication e-mail message includes a confirmation link, the sign-up authentication system may activate the link. Additionally, or alternatively, the sign-up authentication system may send a reply authentication e-mail message to the interaction party server (e.g., as a reply to the sign-up authentication e-mail message) indicating confirmation that the user did sign up with the interaction party. The reply authentication e-mail message may be formatted in a manner by which the interaction party server may be able to confirm the sign-up by the user (e.g., having a preset message recognizable by the interaction party server).

As described above, the sign-up authentication system relieves the computing burden of the user device by searching through the user's e-mail messages for a sign-up authentication e-mail message from the interaction party, and subsequently confirming the sign-up by the user by transmitting a sign-up authentication to the interaction party to complete the sign-up process. By relying on a system separate from the user, the sign-up confirmation process to complete the sign-up process may be efficiently and timely performed. As a result, computing resources of the user (e.g., a user device) and/or of the interaction party (e.g., an interaction party server) may be conserved by not having to perform the tasks that are performed by the system (e.g., scanning e-mail messages and sending sign-up authentications) and/or to remedy those tasks not being performed (e.g., by sending additional e-mail messages and/or starting all over the sign-up process).

As indicated above, FIGS. 1A-1D are provided as an example. Other examples may differ from what is described with regard to FIGS. 1A-1D.

Figure 2:
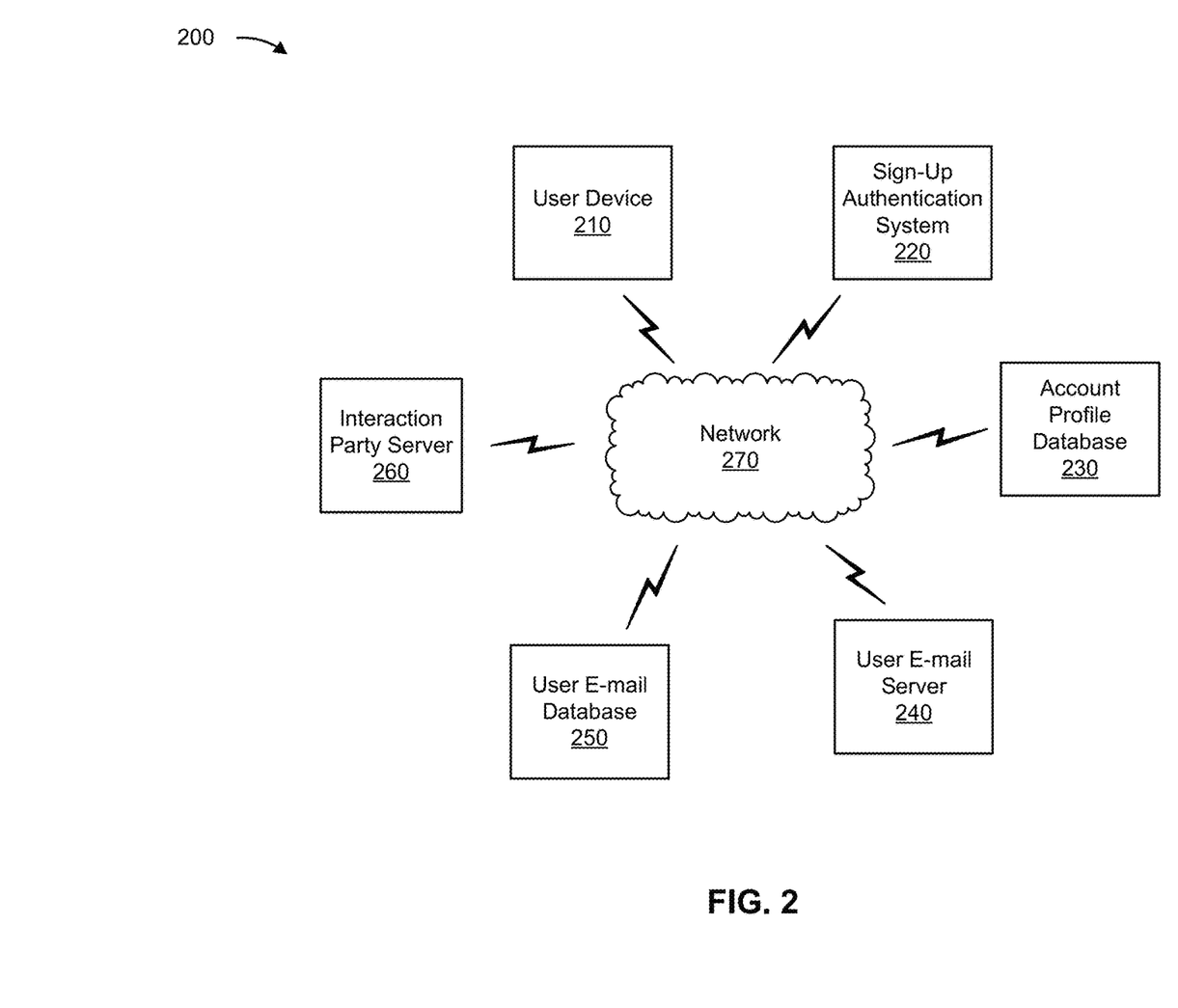
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a sign-up authentication system 220, an account profile database 230, a user e-mail server 240, a user e-mail database 250, an interaction party server 260, and a network 270. Devices of environment 200 may interconnect via wired connections, wireless connections, or a combination of wired and wireless connections.

The user device 210 may include one or more devices capable of receiving, generating, storing, processing, and/or providing information associated with sign-up authentication, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The sign-up authentication system 220 may include one or more devices capable of receiving, generating, storing, processing, providing, and/or routing information associated with sign-up authentication, as described elsewhere herein. The sign-up authentication system 220 may include a communication device and/or a computing device. For example, the sign-up authentication system 220 may include a server, such as an application server, a client server, a web server, a database server, a host server, a proxy server, a virtual server (e.g., executing on computing hardware), or a server in a cloud computing system. In some implementations, the sign-up authentication system 220 includes computing hardware used in a cloud computing environment.

The account profile database 230 may include one or more devices capable of receiving, generating, storing, processing, and/or providing information associated with sign-up authentication, as described elsewhere herein. The account profile database 230 may include a communication device and/or a computing device. For example, the account profile database 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account profile database 230 may store user account information, as described elsewhere herein.

The user e-mail server 240 may include one or more devices capable of receiving, generating, storing, processing, providing, and/or routing information associated with sign-up authentication, as described elsewhere herein. The user e-mail server 240 may include a communication device and/or a computing device. For example, the user e-mail server 240 may include a server, such as an application server, a client server, a web server, a database server, a host server, a proxy server, a virtual server (e.g., executing on computing hardware), or a server in a cloud computing system. In some implementations, the user e-mail server 240 includes computing hardware used in a cloud computing environment.

The user e-mail database 250 may include one or more devices capable of receiving, generating, storing, processing, and/or providing information associated with sign-up authentication, as described elsewhere herein. The user e-mail database 250 may include a communication device and/or a computing device. For example, the user e-mail database 250 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user e-mail database 250 may store e-mails associated with the user e-mail account, as described elsewhere herein.

The interaction party server 260 may include one or more devices capable of receiving, generating, storing, processing, providing, and/or routing information associated with sign-up authentication, as described elsewhere herein. The interaction party server 260 may include a communication device and/or a computing device. For example, the interaction party server 260 may include a server, such as an application server, a client server, a web server, a database server, a host server, a proxy server, a virtual server (e.g., executing on computing hardware), or a server in a cloud computing system. In some implementations, the interaction party server 260 includes computing hardware used in a cloud computing environment.

The network 270 may include one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
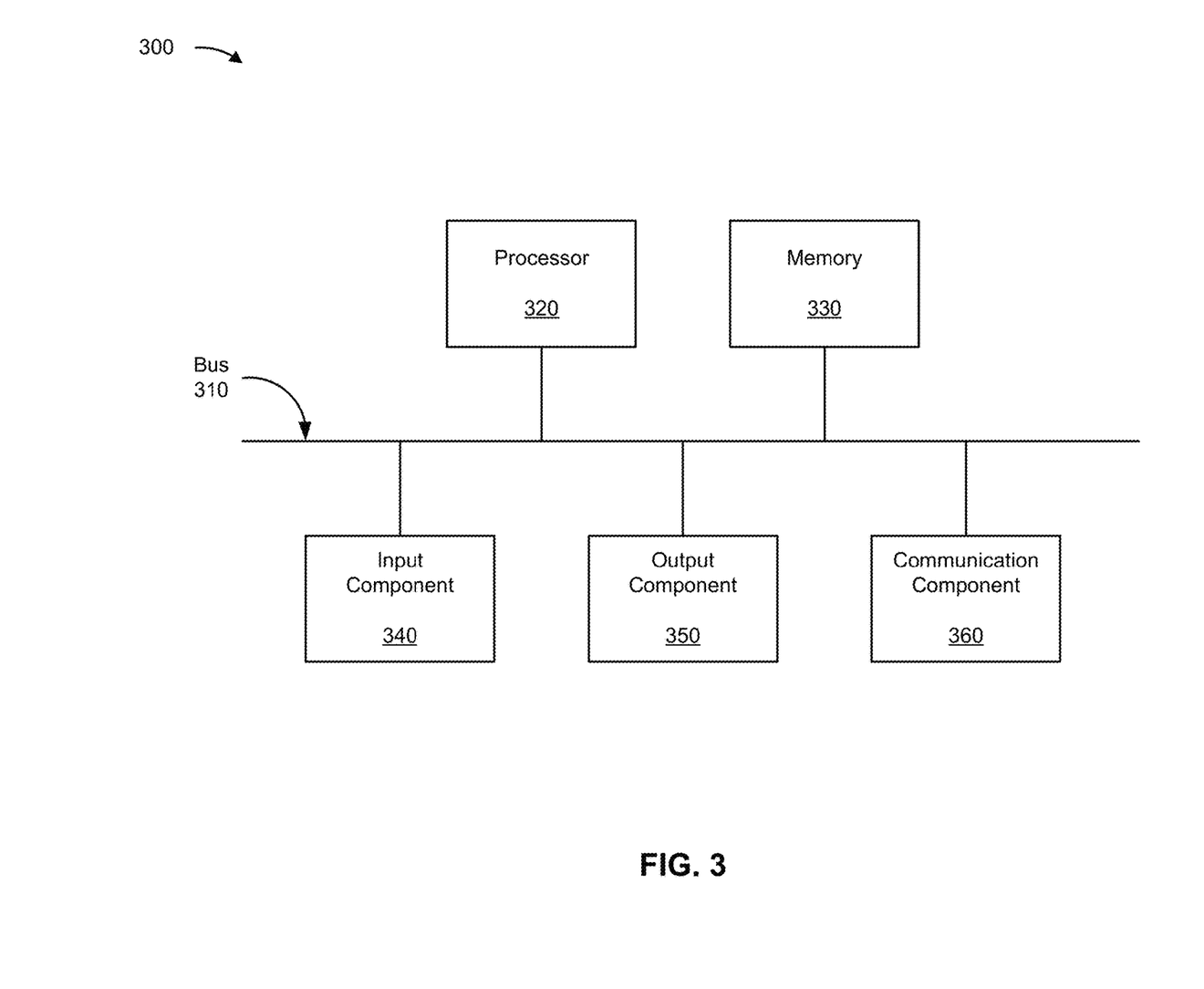
FIG. 3 is a diagram of example components of one or more devices of FIG. 2, in accordance with some embodiments of the present disclosure.

FIG. 3 is a diagram of example components of a device 300, which may correspond to the user device 210, the sign-up authentication system 220, the account profile database 230, the user e-mail server 240, the user e-mail database 250, and/or the interaction party server 260. In some implementations, the user device 210, the sign-up authentication system 220, the account profile database 230, the user e-mail server 240, the user e-mail database 250, and/or the interaction party server 260 include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 may enable device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
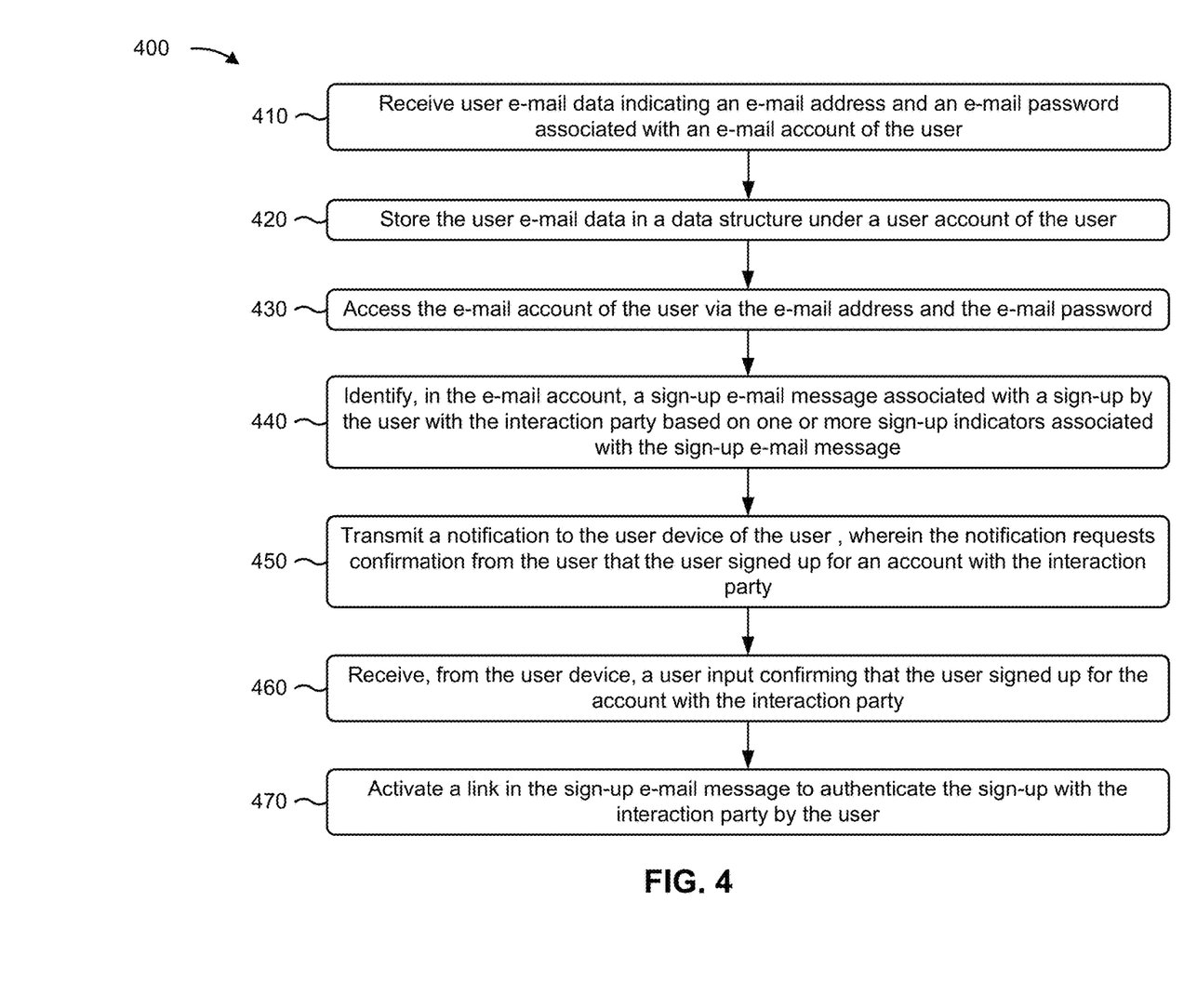
FIG. 4 is a flowchart of an example process relating to sign-up authentication, in accordance with some embodiments of the present disclosure.

FIG. 4 is a flowchart of an example process 400 associated with sign-up authentication. In some implementations, one or more process blocks of FIG. 4 may be performed by the sign-up authentication system 220. In some implementations, one or more process blocks of FIG. 4 may be performed by one or more components of the device 300, such as processor 320, memory 330, input component 340, output component 350, and/or communication component 360.

As shown in FIG. 4, process 400 may include receiving, from a user device of the user, user e-mail data indicating an e-mail address and an e-mail password associated with an e-mail account of the user (block 410). For example, the sign-up authentication system 220 (e.g., using processor 320, memory 330, input component 340, and/or communication component 360) may receive, from a user device of the user, user e-mail data indicating an e-mail address and an e-mail password associated with an e-mail account of the user, as described above in connection with reference number 105 of FIG. 1A. As an example, the sign-up authentication system may receive, from the user device, user e-mail data indicating the user e-mail address and a corresponding e-mail password associated with the user e-mail account.

As further shown in FIG. 4, process 400 may include storing the user e-mail data in a data structure under a user account of the user (block 420). For example, the sign-up authentication system 220 (e.g., using processor 320 and/or memory 330) may store the user e-mail data in a data structure under a user account of the user, as described above in connection with reference number 110 of FIG. 1A. As an example, the sign-up authentication system may store the user e-mail data in a data structure (e.g., in the account profile database under the user account).

As further shown in FIG. 4, process 400 may include accessing the e-mail account of the user via the e-mail address and the e-mail password (block 430). For example, the sign-up authentication system 220 (e.g., using processor 320 and/or memory 330) may access the e-mail account of the user via the e-mail address and the e-mail password, as described above in connection with reference number 115 of FIG. 1A. As an example, the sign-up authentication system may establish a connection with the user e-mail server associated with a particular user e-mail account based on the corresponding user e-mail address and e-mail password.

As further shown in FIG. 4, process 400 may include identifying, in the e-mail account, a sign-up authentication e-mail message associated with a sign-up by the user with the interaction party based on one or more sign-up indicators associated with the sign-up authentication e-mail message (block 440). For example, the sign-up authentication system 220 (e.g., using processor 320 and/or memory 330) may identify, in the e-mail account, a sign-up authentication e-mail message associated with a sign-up by the user with the interaction party based on one or more sign-up indicators associated with the sign-up authentication e-mail message, as described above in connection with reference number 135 of FIG. 1C. As an example, the sign-up authentication system may identify the sign-up authentication e-mail message from the user e-mail server based on one or more sign-up indicators, which may include one or more keywords or key phrases that the sign-up authentication system may associate with a sign-up authentication e-mail message (e.g., using a template matching technique and/or a semantic engine parser).

As further shown in FIG. 4, process 400 may include transmitting a notification to the user device of the user, wherein the notification requests confirmation from the user that the user signed up for an account with the interaction party (block 450). For example, the sign-up authentication system 220 (e.g., using processor 320, memory 330, and/or communication component 360) may transmit a notification to the user device of the user, as described above in connection with reference number 140 of FIG. 1D. As an example, the sign-up authentication system may transmit a notification to the user device. The notification may request confirmation from the user that the user signed up for an account with the interaction party.

As further shown in FIG. 4, process 400 may include receiving, from the user device, a user input confirming that the user signed up for the account with the interaction party (block 460). For example, the sign-up authentication system 220 (e.g., using processor 320, memory 330, input component 340, and/or communication component 360) may receive, from the user device, a user input confirming that the user signed up for the account with the interaction party, as described above in connection with reference number 145 of FIG. 1D. As an example, the sign-up authentication system may receive, from the user device, user input indicating whether or not the user did sign up for the account with the interaction party.

As further shown in FIG. 4, process 400 may include activating the link in the sign-up authentication e-mail message to authenticate the sign-up with the interaction party by the user (block 470). For example, the sign-up authentication system 220 (e.g., using processor 320 and/or memory 330) may activate the link in the sign-up authentication e-mail message to authenticate the sign-up with the interaction party by the user, as described above in connection with reference number 155 of FIG. 1D. As an example, the sign-up authentication system may activate a link included in the sign-up authentication e-mail message for the user to confirm the sign-up with the interaction party.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a user interaction with an interaction party, the system comprising:
   one or more memories; and
   one or more processors, communicatively coupled to the one or more memories, configured to:
   receive, from a user device of a user, user e-mail data indicating an e-mail address and an e-mail password associated with an e-mail account of the user, wherein the e-mail account is hosted by an e-mail server;
   store the user e-mail data in a data structure under a user account of the user;
   access, via the e-mail server, the e-mail account of the user via the e-mail address and the e-mail password;

scan, based on accessing the e-mail account of the user, a subject line or a body of a particular e-mail message in the e-mail account of the user;

identify, in the e-mail account and based on scanning the subject line or the body of the particular e-mail message, a sign-up authentication e-mail message that was transmitted to the user in association with a sign-up by the user with the interaction party based on one or more sign-up indicators associated with the sign-up authentication e-mail message, wherein the sign-up authentication e-mail message includes a link to authenticate the sign-up with the interaction party by the user;

transmit, based at least in part on identifying the sign-up authentication e-mail message in the e-mail account, a pop-up notification to the user device, wherein the pop-up notification requests confirmation from the user that the user signed up for an account with the interaction party;

receive, from the user device and in response to the pop-up notification, a user input confirming that the user signed up for the account with the interaction party; and activate, based on receiving the user input, the link in the sign-up authentication e-mail message to authenticate the sign-up with the interaction party by the user.

2. The system of claim 1, wherein the one or more sign-up indicators are located in the subject line of the sign-up authentication e-mail message.

3. The system of claim 2, wherein the one or more sign-up indicators include a preset subject line.

4. The system of claim 1, wherein the one or more sign-up indicators are located in the body of the sign-up authentication e-mail message.

5. The system of claim 1, wherein the one or more processors, to identify the sign-up authentication e-mail message associated with the sign-up, are configured to:

scan the e-mail account until a new e-mail message is received by the e-mail account; and scan the new e-mail message for the one or more sign-up indicators.

6. The system of claim 1, wherein the one or more processors, to identify the sign-up authentication e-mail message associated with the sign-up, are configured to:

scan the e-mail account at set times or time intervals for one or more new e-mail messages; and scan the one or more new e-mail messages for the one or more sign-up indicators.

7. The system of claim 1, wherein the one or more sign-up indicators include a first name of the user and a last name of the user.

8. The system of claim 1, wherein the one or more processors are further configured to:

transmit, to an interaction party server of the interaction party, identifier data indicating a sign-up code, wherein the one or more sign-up indicators include the sign-up code.

9. A method of authenticating a user interaction with an interaction party, comprising:

establishing, by a system having one or more processors, a connection with an e-mail server that hosts an e-mail account of a user;

obtaining, by the system and from a user account associated with the user, an e-mail address and an e-mail password associated with the e-mail account;

accessing, by the system and via the e-mail server, the e-mail account via the e-mail address and the e-mail password;

scanning, based on accessing the e-mail, a subject line or a body of a particular e-mail message in the e-mail account;

identifying, by the system, in the e-mail account, and based on scanning the subject line or the body of the particular e-mail message, a sign-up authentication e-mail message that was transmitted to the user in association with a sign-up by the user with the interaction party based on one or more sign-up indicators associated with the sign-up authentication e-mail message, wherein the sign-up authentication e-mail message includes a link to authenticate the sign-up with the interaction party by the user;

transmitting, by the system and based at least in part on identifying the sign-up authentication e-mail message in the e-mail account, a pop-up notification to a user device of the user, wherein the pop-up notification requests confirmation from the user that the user signed up for an account with the interaction party;

receiving, by the system and from the user device and in response to the pop-up notification, a user input confirming that the user signed up for the account with the interaction party; and activating, by the system and based on receiving the user input, the link in the sign-up authentication e-mail message to authenticate the sign-up with the interaction party by the user.

10. The method of claim 9, further comprising:

transmitting, to an interaction party server of the interaction party, identifier data indicating a sign-up code, wherein the one or more sign-up indicators include the sign-up code.

11. The method of claim 9, further comprising:

transmitting, to an interaction party server of the interaction party, a reply authentication e-mail message formatted in a manner by which the interaction party server is able to confirm the sign-up by the user.

12. The method of claim 9, further comprising:

receiving, from the user device, user e-mail data indicating the e-mail address and the e-mail password; and storing, in a data structure associated with the user account, the user e-mail data.

13. The method of claim 9, wherein the one or more sign-up indicators are located in the subject line of the sign-up authentication e-mail message.

14. The method of claim 9, wherein the one or more sign-up indicators are located in the body of the sign-up authentication e-mail message.

15. A non-transitory computer-readable medium storing a set of instructions, the set of instructions comprising:

one or more instructions that, when executed by one or more processors of a device, cause the device to:

receive, from a user device of a user, user e-mail data indicating an e-mail address and an e-mail password associated with an e-mail account of the user, wherein the e-mail account is hosted by an e-mail server;

access, via the e-mail server, the e-mail account of the user via the e-mail address and the e-mail password;

scan, based on accessing the e-mail account of the user, a subject line or a body of a particular e-mail message in the e-mail account of the user;

identify, in the e-mail account and based on scanning the subject line or the body of the particular e-mail message, a sign-up authentication e-mail message that was transmitted to the user in association with a sign-up by the user with an interaction party based on one or more sign-up indicators associated with the sign-up authentication e-mail message,
   wherein the sign-up authentication e-mail message includes a link to authenticate the sign-up with the interaction party by the user;

transmit, based at least in part on identifying the sign-up authentication e-mail message in the e-mail account, a pop-up notification to the user device,
   wherein the pop-up notification requests confirmation from the user that the user signed up for an account with the interaction party;

receive, from the user device and in response to the pop-up notification, a user input confirming that the user signed up for the account with the interaction party; and activate, based on receiving the user input, the link in the sign-up authentication e-mail message to authenticate the sign-up with the interaction party by the user.

16. The non-transitory computer-readable medium of claim 15, wherein the one or more instructions, when executed by the one or more processors, further cause the device to:

transmit, to the user device and based at least in part on identifying the sign-up authentication e-mail message in the e-mail account, a notification requesting confirmation from the user that the user signed up for an account with the interaction party; and receive, from the user device, a user input confirming that the user signed up for the account with the interaction party,
   wherein authenticating the sign-up is based on receiving the user input.

17. The non-transitory computer-readable medium of claim 15, wherein the one or more instructions, when executed by the one or more processors, further cause the device to:

transmit, to an interaction party server of the interaction party, a reply authentication e-mail message formatted in a manner by which the interaction party server is able to confirm the sign-up by the user.

18. The non-transitory computer-readable medium of claim 15, wherein the one or more instructions, that cause the device to identify the sign-up authentication e-mail message associated with the sign-up, cause the device to:

scan the e-mail account until a new e-mail message is received by the e-mail account; and scan the new e-mail message for the one or more sign-up indicators.

19. The non-transitory computer-readable medium of claim 15, wherein the one or more instructions, that cause the device to identify the sign-up authentication e-mail message associated with the sign-up, cause the device to:

scan the e-mail account at set times or time intervals for one or more new e-mail messages; and scan the one or more new e-mail messages for the one or more sign-up indicators.

20. The non-transitory computer-readable medium of claim 15, wherein the one or more sign-up indicators are located in the body of the sign-up authentication e-mail message.

\* \* \* \* \*